(12) United States Patent
Martin

(10) Patent No.: US 8,908,994 B2
(45) Date of Patent: Dec. 9, 2014

(54) 2D TO 3D IMAGE CONVERSION

(71) Applicant: NXP B.V., Eindhoven (NL)

(72) Inventor: Francois Martin, Paris (FR)

(73) Assignee: NXP B.V., Eindhoven (NL)

( * ) Notice: Subject to any disclaimer, the term of this patent is extended or adjusted under 35 U.S.C. 154(b) by 164 days.

(21) Appl. No.: 13/737,527

(22) Filed: Jan. 9, 2013

(65) Prior Publication Data

US 2013/0182944 A1 Jul. 18, 2013

(30) Foreign Application Priority Data

Jan. 18, 2012 (EP) .................................... 12290022

(51) Int. Cl.
*G06K 9/36* (2006.01)
*G06K 9/46* (2006.01)
*G06T 15/00* (2011.01)
*H04N 13/02* (2006.01)
*H04N 13/00* (2006.01)

(52) U.S. Cl.
CPC .............. *G06T 15/00* (2013.01); *H04N 13/026* (2013.01); *H04N 13/0022* (2013.01); *H04N 13/0271* (2013.01)
USPC ............................. 382/285; 382/190; 382/291

(58) Field of Classification Search
None
See application file for complete search history.

(56) References Cited

U.S. PATENT DOCUMENTS

| 2008/0247670 A1 | 10/2008 | Tam et al. |
| 2009/0196492 A1 | 8/2009 | Jung et al. |
| 2010/0182410 A1 | 7/2010 | Verburgh et al. |
| 2011/0043540 A1 | 2/2011 | Fancher et al. |
| 2011/0069152 A1 | 3/2011 | Wang et al. |
| 2011/0141237 A1 | 6/2011 | Cheng et al. |
| 2011/0188773 A1* | 8/2011 | Wei et al. ....................... 382/260 |
| 2011/0188780 A1 | 8/2011 | Wang |
| 2012/0002862 A1 | 1/2012 | Mita et al. |

OTHER PUBLICATIONS

Battiato et al, "Depth-Map Generation by Image Classification," 2004, Proc. of SPIE—IS&T Electronic Imaging, SPIE vol. 5302, pp. 95-104.*
Tsai et al, "A Real-Time 1080p 2D-to-3D Video Conversion System," 2011, Consumer Electronics, IEEE Transactions on 57.2 (2011), pp. 915-922.*
Battiato, S. et al., "3D Stereoscopic Image Pairs by Depth-Map Generation", Proc. of the 2nd Int'l. Symp. on 3D Data Processing, Visualization and Transmission (3DPVT04), pp. 124-131 (Sep. 2004).
Nedovic, V. et al. "Depth Information by Stage Classification", IEEE 11th Int'l. Conf. on Computer Vision, 8 pgs. (Oct. 2007).
Tam, W. J. et al. "Three-dimensional TV: A Novel Method for Generating Surrogate Depth Maps Using Colour Information", Proceedings of SPIE, vol. 7237, pp. 72371A-72371A-9 (2009).
Torralba, A. et al. "Depth Estimation from Image Structure", IEEE Trans. on Pattern Analysis and Machine Intelligence, vol. 24, No. 9, pp. 1226-1238 (Sep. 2002).
Wei, Q., "Converting 2D to 3D: A Survey", Delft University of Technology, Faculty of Electrical Engineering, Mathematics and Computer Science, 40 pgs. (Dec. 2005).
Extended European Search Report for European Patent Appln. No. 12290022.8 (Jul. 5, 2012).

* cited by examiner

*Primary Examiner* — Bhavesh Mehta
*Assistant Examiner* — David F Dunphy

(57) ABSTRACT

A method (and system) of processing image data in which a depth map is processed to derive a modified depth map by analyzing luminance and/or chrominance information in respect of the set of pixels of the image data. The depth map is modified using a function which correlates depth with pixel height in the pixelated image and which has a different correlation between depth and pixel height for different luminance and/or chrominance values.

14 Claims, 10 Drawing Sheets

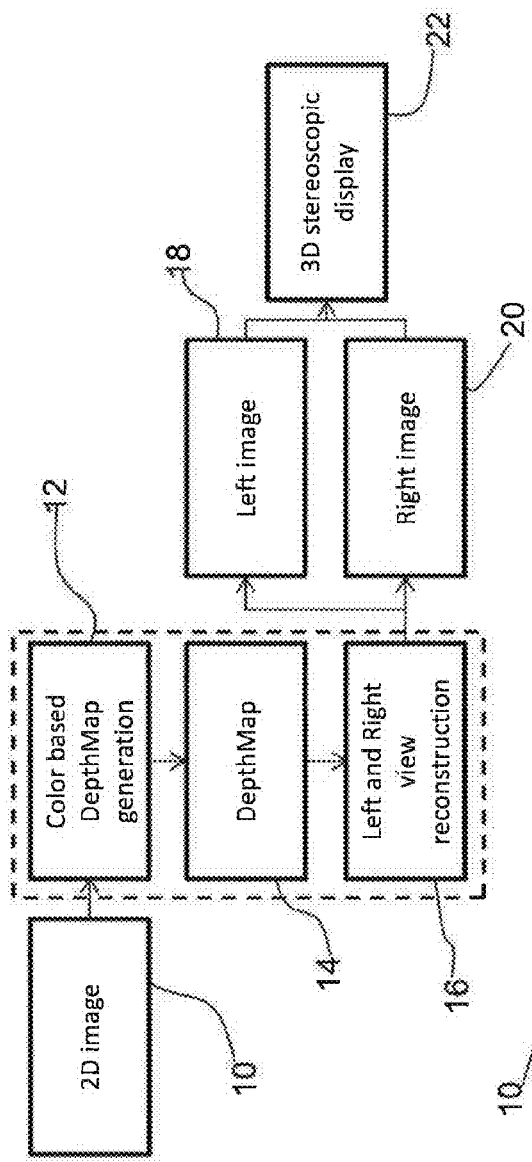
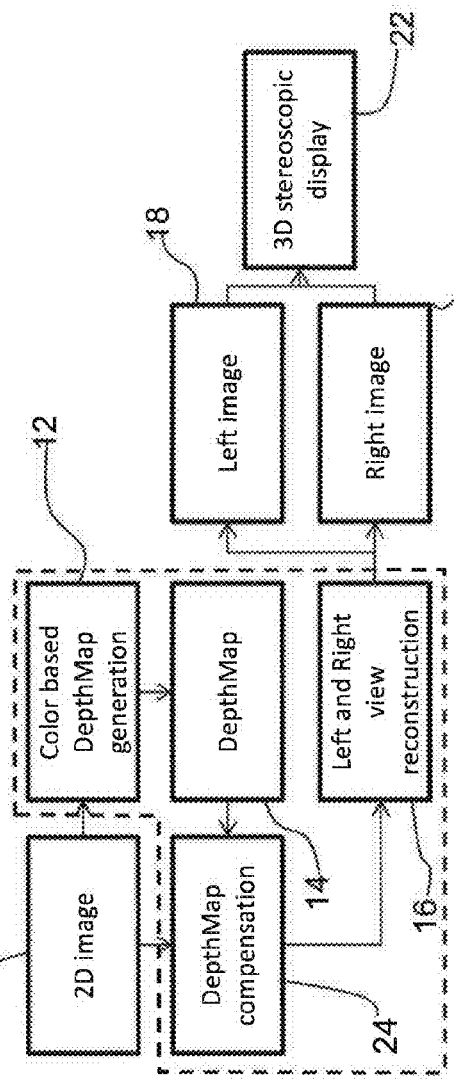
FIG. 1
FIG. 2

2D TO 3D IMAGE CONVERSION

CROSS-REFERENCE TO RELATED APPLICATIONS

This application claims the priority under 35 U.S.C. §119 of European patent application no. 12290022.8, filed on Jan. 18, 2012, the contents of which are incorporated by reference herein.

This invention relates to the generation of 3D stereoscopic image data from a 2D image source. Essentially, one form of 3D image data comprises a 2D image which is supplemented by a depth map. The 2D image and the depth map can then for example be processed to display a 3D image using a 3D image display device. This may for example involve deriving separate left-eye and right-eye views from the image data and the depth map.

Creation of a depth map from a 2D image is a field that is extensively researched. This is also known as 2D to 3D conversion, so that a 2D image or 2D video can be experienced in 3D on 3D stereoscopic displays.

A first set of examples of known algorithms is based on performing content analysis to identify different objects within an image, such as landscape and geometrical objects. Different depths can be assigned to different objects. An example is outlined in US 2011/0188780. A similar approach is to classify extracted features from different regions of an image as disclosed in US 2011/0043540.

These approaches are very computationally intensive. A second set of examples uses color to define a depth map, for example as disclosed in US 2010/0182410 and US 2008/0247670. For a given object, local changes in color (chrominance) can be attributed to local depth variations, as a result of shading in local ridges and valleys.

The various techniques can be combined.

A summary of known techniques is presented in the paper "Converting 2D to 3D: A survey" by Qingqing Wei in 2005 at the Technical University of Delft, and published on the University website.

Even though several techniques are available, there is still room for improvement. Moreover, most of the known techniques are very computationally intensive, so that a simple algorithm would be desirable even if it does not create a perfect depth map.

The invention is of particular interest for the enhancement of an existing depth map, for example originally created with a 2D to 3D conversion process based on colour.

According to the invention, there is provided a method and apparatus as defined in the independent claims.

In one aspect, the invention provides a method of processing image data comprising:
receiving 2D image data representing a pixelated image with width and height;
receiving a depth map in respect of the 2D image data;
processing the depth map to derive a modified depth map;
generating left and right image data together forming a 3D image based on the modified depth map and the 2D image data,
wherein processing the depth map comprises one or both of:
analysing luminance information in respect of the set of pixels, and modifying the depth map using a function which correlates depth with pixel height in the pixelated image and which has a different correlation between depth and pixel height for different luminance values;
analysing chrominance information in respect of the set of pixels, and modifying the depth map using a function which correlates depth with pixel height in the pixelated image and which has a different correlation between depth and pixel height for different chrominance values.

By correlating depth with pixel height (and in a manner which is dependent on chrominance and/or luminance), a number of different naturally occurring depth cues can be used to modify a depth map. In this way, depth maps generated by a 2D to 3D conversion process can be enhanced. The invention can be applied to any obtained depth map, but it can most effectively be applied to depth maps derived based on color.

The enhancements are based on the observation of natural scene depth cues which show a relationship between depth and height up the image. Examples are distant sky and nearby ground, and distant sky and nearby water which reflects the sky color.

The invention can be implemented as a pixel based algorithm, which means it can be easily implemented in OpenGL (General-purpose processing on GPU) and performed real-time on mobile platform.

The function can including a mapping of luminance values to a depth value. This can for example be used to reflect that very dark image portions (which are shadowed from a light source facing the viewer) are likely to be near, and that very bright image portions are also likely to be near.

For high luminance values the function can have a greater correlation between depth and pixel height than for low luminance values. This is a way of detecting sky and increasing (relatively) the depth associated with those image portions. Thus, for high luminance values, the function derives a greater depth for pixels at the top of the image.

Modifying the depth map can comprise generating a first compensation depth map using the function, and combining the first compensation depth map with the received depth map.

The first compensation depth map can for example be scaled in dependence on a midtone analysis of the luminance information of the image, before being combined with the received depth map. This is used to detect an image of text having a large range of luminance values. The depth modification may need to be suppressed in this case to avoid artefacts. The midtone analysis can comprise obtaining a ratio of the number of pixels with luminance within a central luminance band compared to the total number of pixels. The scaling is then greatest for images with high ratio of central luminance band pixels.

The combination of the first compensation depth map with the received depth map can use a weighting factor, which determines how much depth map modification should be made.

The weighting factor can be based on a saturation analysis of the chrominance content of the image data. For example the saturation analysis comprises determining the range of U and V values within the image and deriving a chrominance saturation measure.

The original depth map will be modified less if there is a large chrominance saturation. An image with a large saturation range cannot be an image where the sun is facing the camera. In that case the saturation range will be low. The saturation range is required rather than only saturation values, in order to take account of situations where the saturation is high but the range is low (e.g. sunset).

The method can further comprise detecting blue pixels in the image, and for the blue pixels further modifying the depth map with a second function which correlates depth with pixel height in the pixelated image. This approach can be used to detect sky and reflected sky in (nearer) water. Further modifying the depth map can again comprise generating a second compensation depth map using the second function, and combining the depth map as modified by the first function with the second compensation depth map.

The invention can be implemented as a computer program.

In another aspect, the invention provides an image data processor, comprising:

means for receiving a 2D image data representing a pixelated image with width and height;

means for receiving a depth map in respect of the 2D image data;

a processor for processing the depth map to derive a modified depth map;

means for generating left and right image data together forming a 3D image based on the modified depth map and the 2D image data, wherein the processor is adapted to perform one or both of:

analysing luminance information in respect of the set of pixels, and modifying the depth map using a function which correlates depth with pixel height in the pixelated image and which has a different correlation between depth and pixel height for different luminance values;

analysing chrominance information in respect of the set of pixels, and modifying the depth map using a function which correlates depth with pixel height in the pixelated image and which has a different correlation between depth and pixel height for different chrominance values.

Examples of the invention will now be discussed in detail with reference to the accompanying drawings, in which:

FIG. 1 shows a generic color-based process to perform 2D to 3D stereoscopy conversion;

FIG. 2 shows the process of the invention in outline form;

Figure 3:
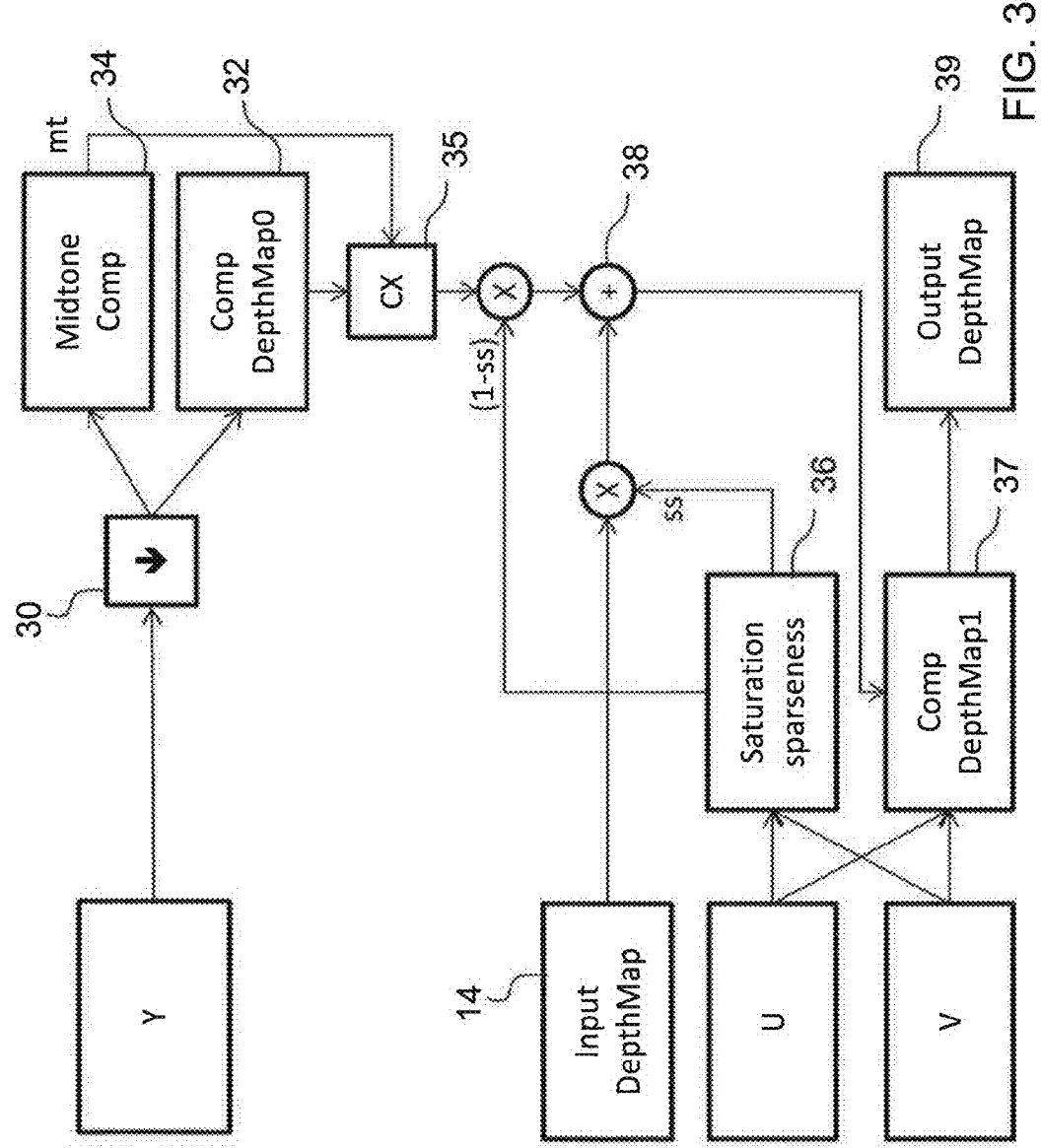
FIG. 3 shows the function of the depth map compensation unit of FIG. 2.

The invention provides a method (and system) of processing image data in which a depth map is processed to derive a modified depth map by analysing luminance and/or chrominance information in respect of the set of pixels of the image data, and modifying the depth map using a function which correlates depth with pixel height in the pixelated image and which has a different correlation between depth and pixel height for different luminance and/or chrominance values.

The invention enables various compensation methods to be implemented, based on luminance value analysis or blue value analysis of a 2D image or of a 2D frame of a video stream. The compensation methods are based on various observations of natural scenes. The compensated depth map may then be used for the creation of 3D stereoscopic content in a 2D to 3D conversion process.

In the description below 3D shall be understood to relate to 3D stereoscopy, and not 3D graphics.

The invention can be used to modify a depth map derived using existing methods of 2D to 3D conversion, for example based on color analysis, to enhance the depth map generation process.

The invention is based on simple algorithms so that it can be implemented on a mobile phone and be executed real time for HD video content.

FIG. 1 shows a generic color-based process to perform 2D to 3D stereoscopy conversion.

A 2D image 10 is processed using a color-based depth map generation unit 12 to derive the depth map 14. This is used by a processor 16 which generates left and right images 18,20 for presentation to a 3D stereoscopic display 22.

FIG. 2 shows the process of the invention. The same reference numerals are used as in FIG. 1. The invention provides additional processing of the depth map 14 by a depth map compensation unit 24.

The function of the depth map compensation unit 24 is shown in FIG. 3.

The input depth map 14 is generated by an external process and the process is based on the analysis of the color of the content. The resolution of the input depth map is preferably the resolution of the chrominance components of the input image or video.

The depth map is an array of pixels each assigned a depth value indicating the relative or absolute distance to the viewer or a reference plane, from the part of the image corresponding to the pixel.

The original depthmap 14 can be computed with a bicubic function F (similar to one described below) and which uses chrominance U and V values as the input parameters. The function gives different depth values for each pixel based on its U,V pair. The parameterization of this function is also based on empirical observations such as: blue represents sky and shall be in the background, green represent grass and shall be in the foreground, red and magenta do not have specific meaning and shall be kept average, a chrominance point representing skin tone shall be in the foreground.

A depth map generated using a pixel-based approach (rather than object identification and analysis) will only give an approximation to an accurate depth map, but it has the advantage that low processing power is required. The invention can be used to improve such a depth map, again with low requirements on processing power.

In FIG. 3, Y is the luminance plane of the 2D image. The luminance plane is downscaled by unit 30 to the U,V Chrominance plane so that the input depth map and compensation depth maps (discussed below) are of the same size.

A first compensation depth map 32 ("Comp DepthMap0") is a depth map compensation component based on luminance analysis.

A midtone compensation unit 34 computes a scaling factor mt to be applied to the first compensation depth map ("Comp DepthMap0"). The factor mt is computed based on the analysis of the histogram of the Y luminance plane.

The scaling factor mt is applied centrally to the distribution of the first compensation depth map ("Comp DepthMap0"), by the combination element 35. The depth values are used to represent a pixel in front of or behind the display. By applying a scaling factor centrally, the depth is stretched relatively to a 0 point representing the display position. Consequently if mt is zero the depth will be flat and all pixels will be represented at the display position. In the example below depth is represented by a value between 0 and 1, and the central position or display position is represented by the value 0.5.

The U and V components of the image are applied to a saturation sparseness computation unit 36 and to a unit 37 for computing a second compensation depth map ("Comp DepthMap1"). The unit 36 computes the sparseness of the chrominance in the content. The intent is to detect how saturated is the image and at the same time take into account any chrominance cast in monochromatic content.

Depending on the saturation sparseness computed, a weighted sum of the input depth map and of the first compensation depth map ("Comp DepthMap0") is computed. As shown, the input depth map is multiplied by a factor ss, whereas the first compensation depth map 32 (after mid-tone compensation) is multiplied by a factor (1-ss), and these two elements are combined by adder 38.

The second compensation depth map 37 ("Comp DepthMap1") is a depth map compensation component that takes into account a range of blue values and further processes the depth map generated in the previous steps, as output by adder 38.

The output depth map is then derived.

The different compensation processes will now be discussed in detail.

The computation of the first compensation depth map ("Comp DepthMap0") takes the Y luminance plane of a 2D image, or of a 2D frame from a video, and creates the first compensation depth map.

The 2D image is a pixelated image of height h and width w. For each pixel position (w,h) of the Y luminance plane a transfer function F is computed based on the pixel height h (e.g. from the top to bottom of the image) and the value of the luminance at the pixel position Y(w,h). For the algorithm, the Y values of the luminance plane are normalized between 0.0 and 1.0 and a depth value of 0.0 represents the farthest depth while a value of 1.0 represents the closest depth.

The transfer function based on luminance takes into account two observations:

(i) The known haze 3D depth cue: for a viewer looking at a scene where haze is present, high contrast elements will be represented near the viewer whereas low contrast elements will be represented far from the viewer. A pixel-based analysis, and one which does not use object analysis, cannot determine a contrast of image elements. Thus, the haze depth cue can be implemented by considering bright or dark pixels to be near the viewer and midtone pixels to be far from the viewer. Thus, the haze depth cue is implemented by a relationship between luminance and depth.

(ii) The observation that for a viewer/camera facing light, dark objects will be near the viewer (as these are in a shadow which has not been lightened by scattering and reflections). Bright objects will be far from the viewer if they are positioned at the top of the scene (probability of sky and sun) and they will be near the viewer if they are positioned at the bottom of the scene. This is related to the haze 3D depth cue, together with a relationship to the pixel height.

These two observations thus result in a function which has a relationship between luminance and depth, but also with a relationship (i.e. a correlation) to the pixel height, which relationship is dependent on the luminance.

Any function F verifying the above conditions can be used.

A possible implementation of the function F is a bicubic interpolation function of the form:

$$F\left(Y, \frac{h}{h\max}\right) = \sum_{i=0}^{3} \sum_{j=0}^{3} a_{ij} Y^i \left(\frac{h}{h\max}\right)^j$$

Where aij coefficients are defined by the value of F at the limit of the square delimited by the minimum and maximum values of Y and h/hmax: F(0,0), F(0,1), F(1,0), F(1,1) and the various derivative along each axis Fx, Fy and Fxy at the same position.

As shown, this function creates values which depend on the relative height of the pixel in the image (i.e. h/hmax) as well as the luminance value Y.

The function F helps to model the two observations explained above. It is parameterized by providing for each extreme values (Y, h/hmax) of the function surface ((bottom, black), (bottom, white), (top, black) (top, white)) the observed depth values. By providing first derivatives at these points it will change the curvature of the surface in order to reach the desired values at intermediary points. The bi-cubic F function helps to have a smooth transition of depth when luminance and height changes between pixels.

Figure 4:
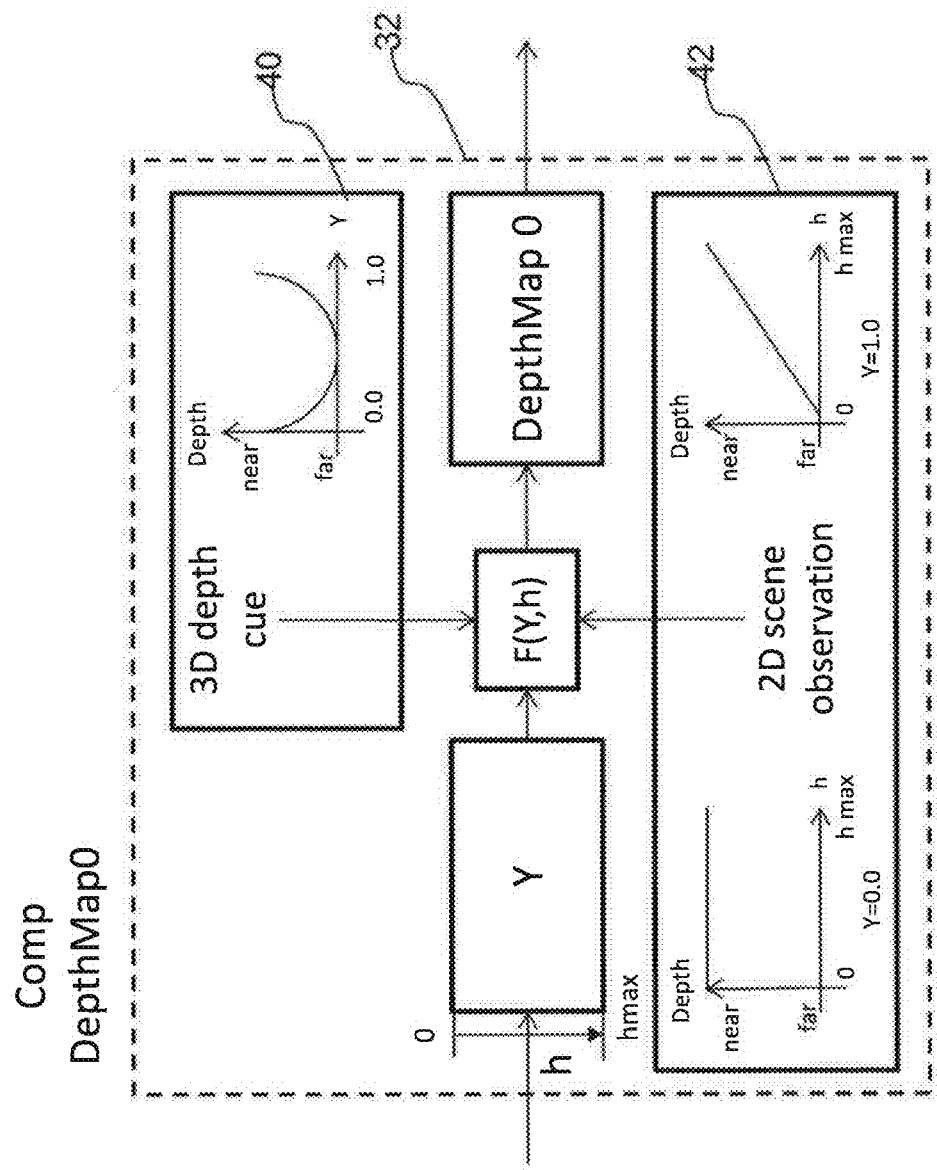
FIG. 4 shows how the first compensation depth map ("Comp DepthMap0") used in FIG. 3 is created.

FIG. 4 shows the way the first compensation depth map ("Comp DepthMap0") is created.

The function F is created based on the luminance map Y, and applies two rationales.

The first rationale 40 is based on mapping luminance Y to depth such that dark pixels are assumed be near to the viewer but bright pixels are also assumed to be near to the viewer. This is particularly for scenes illuminated from behind or in the presence of haze. Thus, the haze based observation is represented by function 40.

The second rationale 42 maps pixel height position h to depth in dependence on the luminance. For bright pixels a height dependency is assumed, i.e. bright distant sky is at the top of the image (h=0) but bright objects at the bottom of the image (h=1) are nearby. For dark pixels, the depth is not assumed dependent on the pixel height. Thus, the facing light source observation is represented by function 42.

The function F is used to generate the first compensation depth map.

Figure 5:
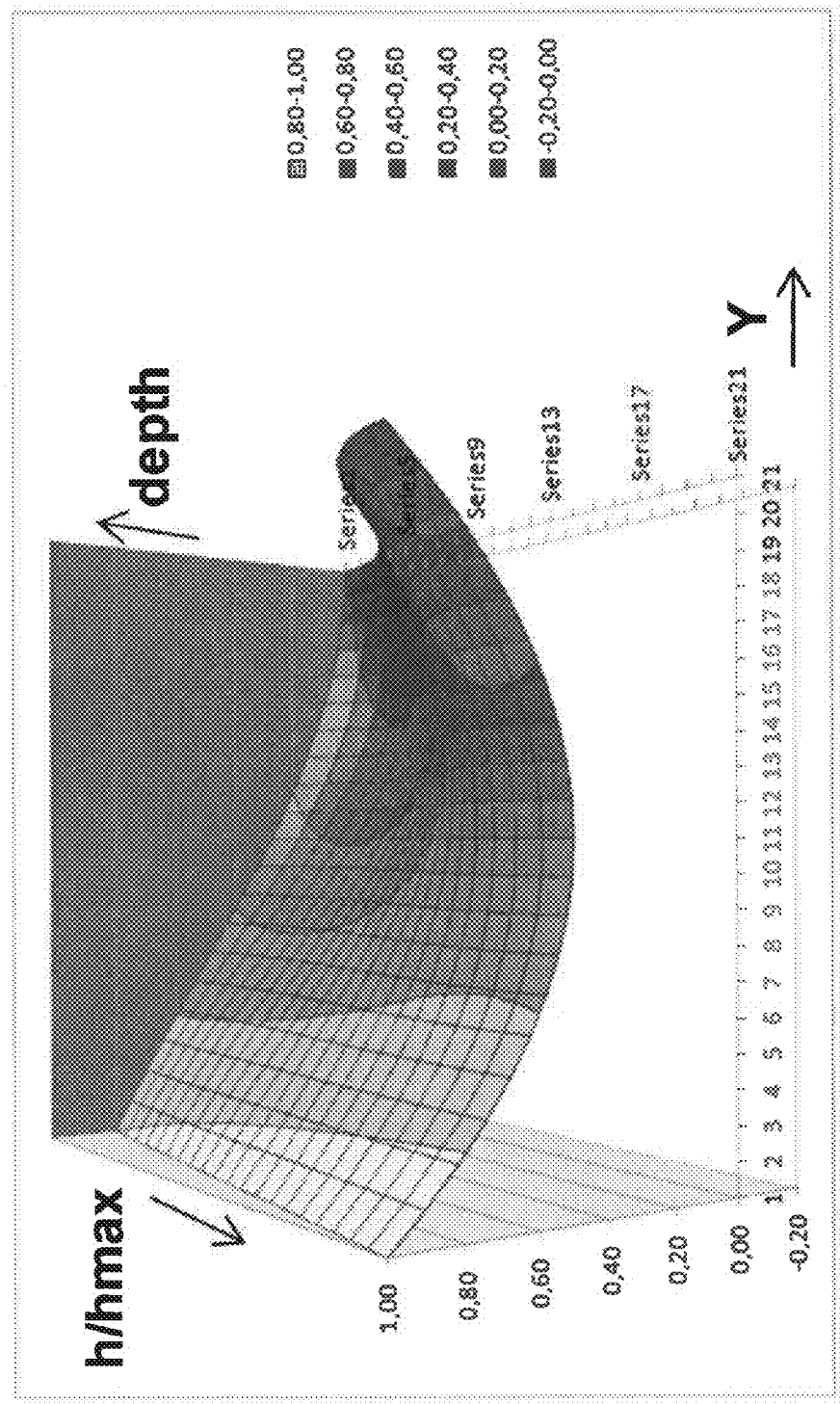
FIG. 5 is a representation of the bicubic interpolation function Fused in the system of FIG. 3.

FIG. 5 is a representation of the bicubic interpolation function F. The value of h/max is from 0.0 to 1.0 and the luminance Y is from 0.0 to 1.0.

The functions 40 and 42 are combined by the function F and can partly be observed at the limit of the surface represented in FIG. 5. Function 40 is at the bottom of the surface, function 42 us at the right side (dark pixel values) and left side (bright pixel values) of the surface.

The F function includes both the haze/contrast observation ((i) above) and the sky/height position observation ((ii) above). Combining the two observations in one function F leads to the a function in which the haze property is dominant at low height, whereas at high height the sky property is dominant.

This can be observed in the surface graph of FIG. 5. At low height the curve is such that high and low tone values have high depth (1.0) whereas mid tone values (grey) have a lower depth (0.5).

At top of the image (high height) the height impact is predominant: low tone values have high depth (0.8) and high tone values have low depth (0.0). Note that the top of the image is represented with h=0 while bottom of the image is represented with h=hmax. Consequently in the implementation low height is represented by value 1 whereas high height is represented by value 0.

There is no object-based processing required and none is assumed in the original depth map. In this way, all processing can be at the pixel level.

The mid tone compensation 34 is used when no or nearly no mid tones are present in the image. It has been noted that when highly contrasted text is present in an image (e.g. white text on black background or vice versa) the generated first compensation depth map can lead to artifacts that would limit the readability of text when 3D is reconstructed.

For overcoming these potential artifacts the detection of the mid tone content is put in place and a factor mt is computed.

The mt value is computed based on a histogram analysis of the luminance plane Y of the image.

Figure 6:
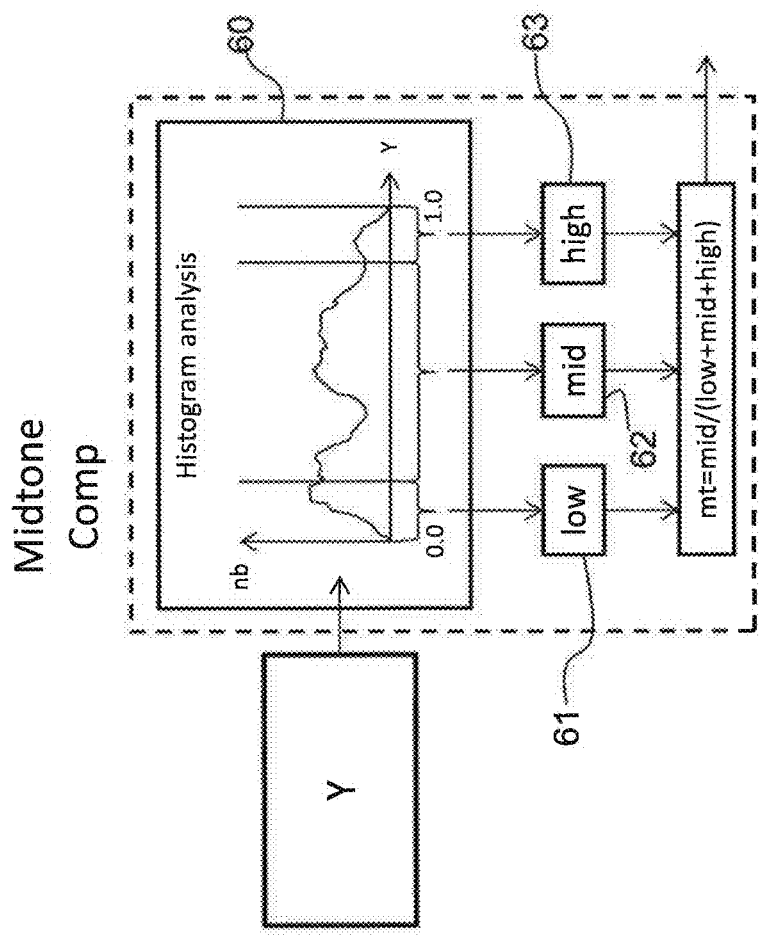
FIG. 6 is used to explain the midtone compensation used in the system of FIG. 3.

The midtone compensation is shown in FIG. 6.

The histogram analysis is represented by the graph 60, and it is divided into three zones of luminance Y.

In this example, the number of low tone occurrences "low" (shown as block 61) is the sum of occurrences of pixels in the Y plane when the value Y for these pixels is lower than 0.2.

The number of mid tone occurrence "mid" (shown as block 62) is the sum of occurrences of pixels in the Y plane when the value Y for these pixels is between 0.2 and 0.8.

The number of high tone occurrence "high" (shown as block 63) is the sum of occurrences of pixels in the Y plane when the value Y for these pixels is higher than 0.8.

The mt value is the ratio mid/(low+mid+high), and thus represents the proportion of pixels have a mid range luminance value.

The thresholds 0.2 and 0.8 are empirical based on tests made on several video contents. Other values can be chosen for these thresholds.

It is noted that the mid tone compensation is optional to the computation of the first compensation depth map.

Figure 7:
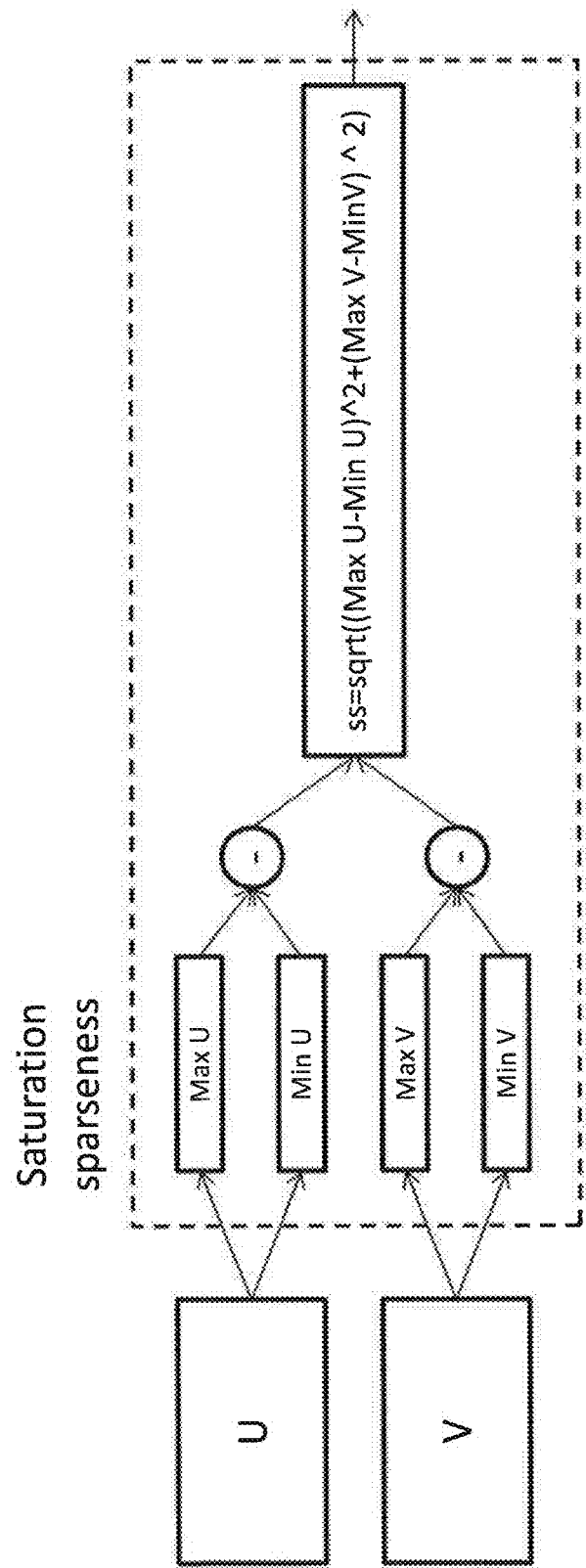
FIG. 7 is used to explain the saturation sparseness computation used in the system of FIG. 3.

The saturation sparseness computation is shown in FIG. 7.

The saturation sparseness aims at identifying the range of saturation in the image. It is also aimed at identifying if a chrominance shift is present in a lowly saturated or monochromatic image. This is to take into account any possible white balance effect in the acquisition of the content.

The saturation sparseness is computed to decide how much of the first compensation depth map ("Comp DepthMap0") shall be applied to the input depth map.

The saturation sparseness is computed based on the min and max values that occur in the U and V chrominance plane of the image.

As shown in FIG. 7, the maximum and minimum U and V values are obtained, and the two differences (MaxU−MinU and MaxV−MinV) are determined, representing the U and V ranges.

The square of the respective ranges in U and V plane are summed and rooted to compute the scaling value "ss", which is a measure of the saturation sparseness.

As shown in FIG. 3, the ss factor is applied to the input depth map whereas the (1-ss) factor is applied to the first compensation depth map (with our without mid tone compensation).

It is assumed that the U and V values are normalized between −0.5 and 0.5.

Other sparseness measures can be used, for example based on a more accurate analysis of the U and V histogram.

Figure 8:
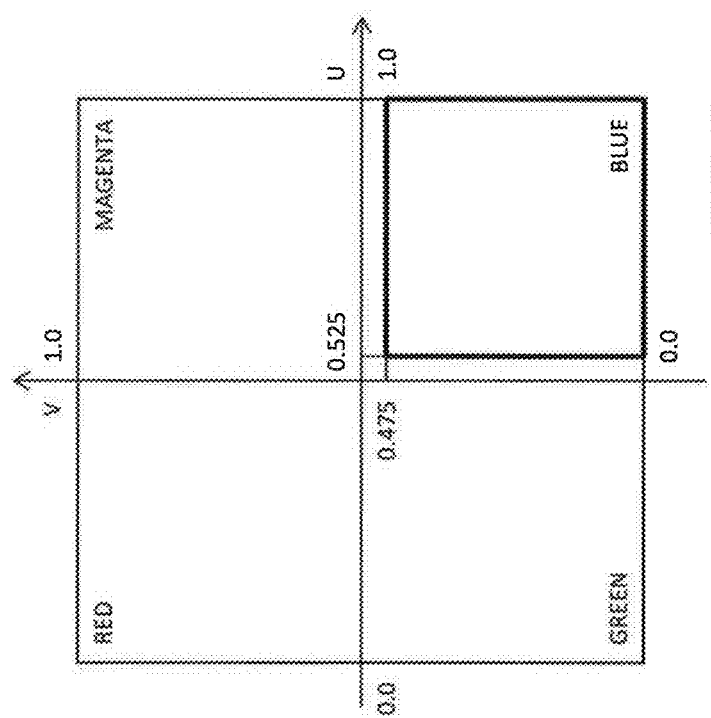
FIG. 8 shows the region of normalised UV space that can be considered to be blue.
Figure 9:
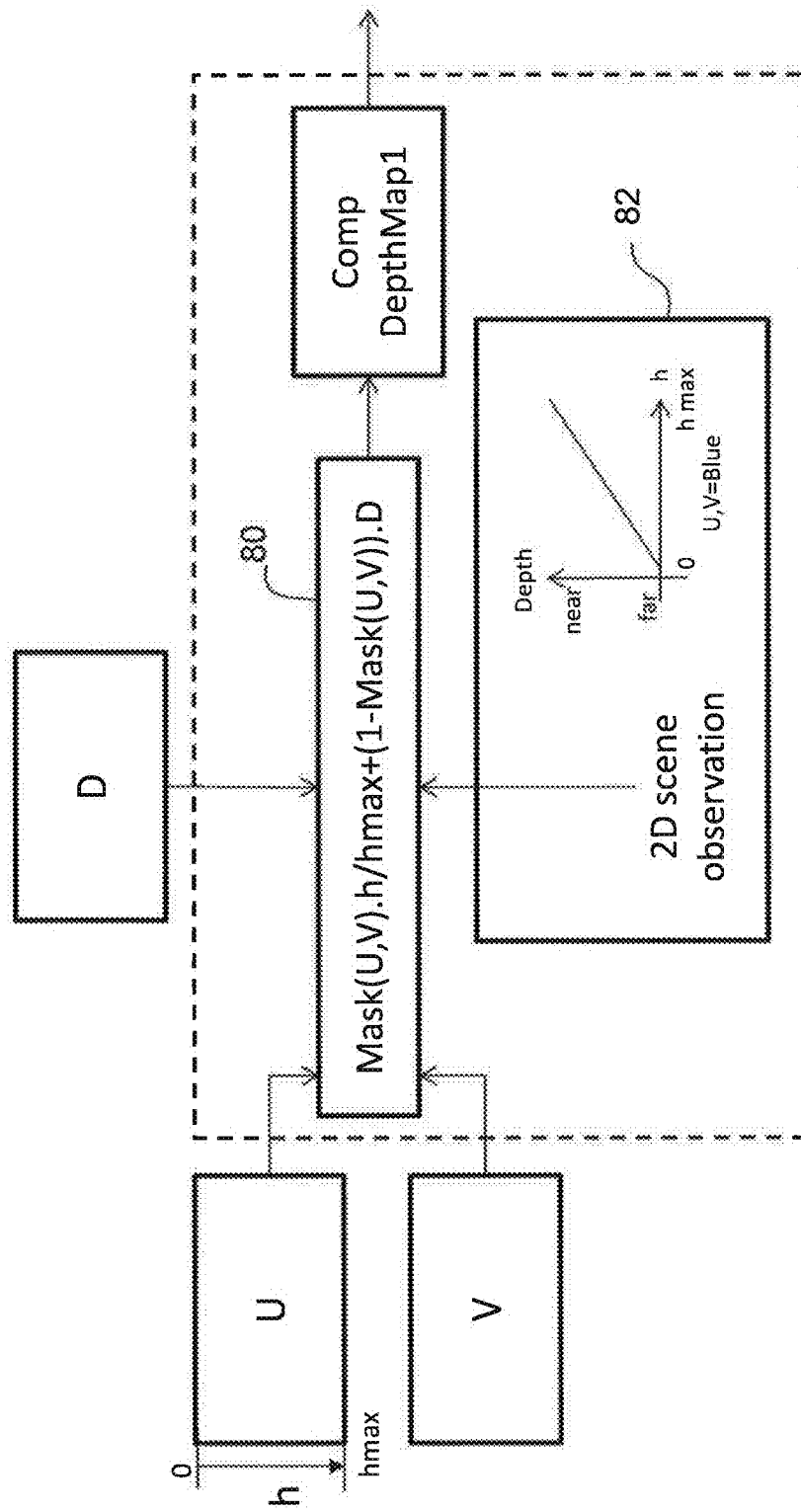
FIG. 9 shows how the second compensation depth map ("Comp DepthMap1") used in FIG. 3 can be computed.
Figure 10:
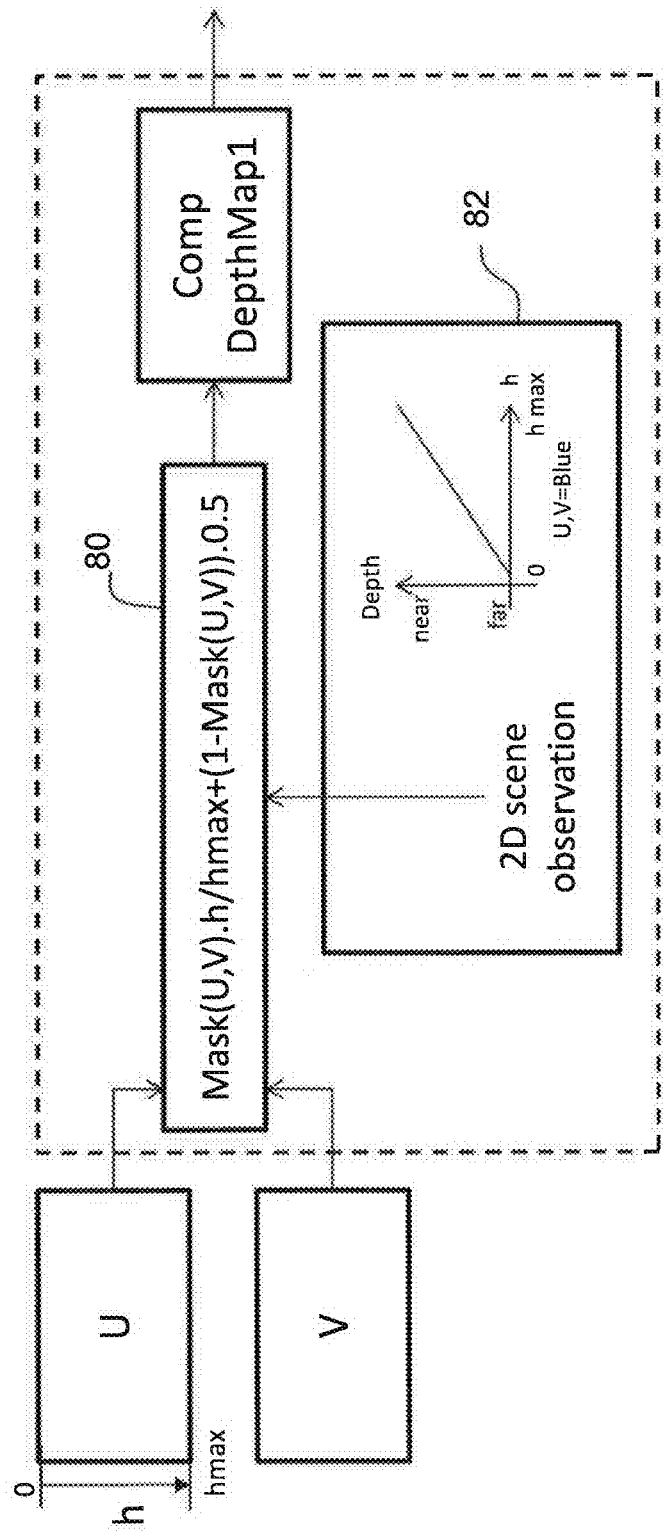
FIG. 10 shows an alternative way to use the second compensation depth map ("Comp DepthMap1") of FIG. 3.

The computation of the second compensation depth map ("Comp DepthMap1") is shown in FIGS. 8 to 10.

This compensation is based on the presence of blue, and in particular the observation that in the presence of blue sky, if there is blue at the bottom of the image then it is usually the reflection of the sky on water. Therefore blue at the top of the image shall be determined to be far and blue at the bottom of the image shall be determined to be near.

In order to compute the second compensation depth map ("Comp DepthMap1") it has to be identified if a pixel of the image is a blue pixel. This is based on searching for a pixel in a range within the U,V colour space where various nuances of blue are present.

A mask is used as a filter to detect blue pixels. At each pixel position (w,h), the mask function Mask(U,V) is computed based on the U and V values at this pixel position.

FIG. 8 shows the region of normalised UV space that can be considered to be blue.

A possible implementation of the Mask function can be based on sigmoid functions and will be computed as follows:

$$\text{Mask}(U, V) = \frac{1}{(1 + \exp(50.(0.525 - U)))} \cdot \frac{1}{(1 + \exp(50.(-0.475 + V)))}$$

This mask function gives a value approaching 1 in the blue area (the exponential terms tend to zero) and a value approaching zero outside the blue area (the exponential terms are very large), with a sharp transition at the boundary. With a suitable threshold, the function can be rounded to 1 or zero to define a simple yes-no decision.

As shown in FIG. 9, the second compensation depth map ("Comp DepthMap1") is computed where for blue values identified by the mask, the depth will be dependent on the height position h of the pixel in the image, and the rest of the depth map is set to the previous depth map value D.

The rationale is shown by the graph 82, where for blue pixels, the depth is assumed to be linearly related to the pixel height.

Another possible implementation is to compute a new depth map independently from the input depth map D. In that case the new second compensation depth map is computed where for blue values the depth will be dependent on the height position h of the pixel in the image, and the rest of the depth map is set to a default depth value such as 0.5.

This approach is shown in FIG. 10, in which the second compensation depth map is not applied to an input depth map as in FIG. 9.

Figure 11:
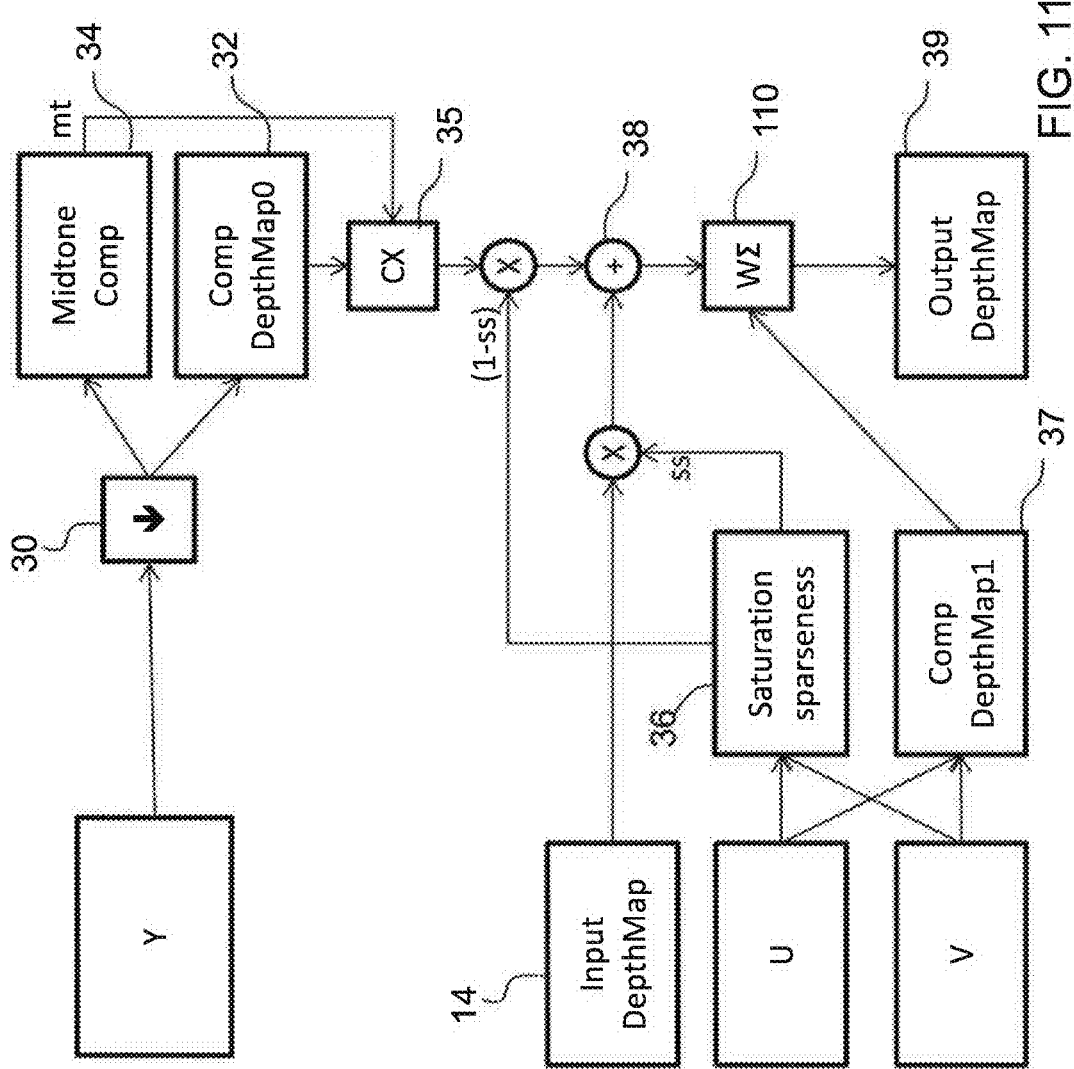
FIG. 11 shows a modification to FIG. 3 to use the second compensation depth map of FIG. 10.

The first and second compensation depth maps then need to be combined, and this is shown in FIG. 11 which shows a variation to FIG. 3. A weighted sum 110 is applied between the first compensation depth map 32 (after scaling for saturation sharpness) and the second compensation depth map 37.

The outcome of the weighted sum is computed resulting in the fully compensated depth map 112 ("Output DepthMap").

The luminance compensation (first) depth map can be computed independently from the blue compensation (second) depth map.

The midtone compensation is an add-on to the computation of the first compensation depth map in order to limit some artifacts of the created depth, in particular for contrasted text.

The saturation sparseness may be avoided by choosing a fixed linear combination of the input depth map 14 and the first compensation depth map.

The invention can be used with any 2D to 3D conversion algorithm based on color. These algorithms are currently used in TVs and mobile phones.

Specific examples of applications are:

Converting content (image or video) from 2D to 3D in order to mix with other 3D related content;

Converting content (image or video) from 2D to 3D in order to share it with a person who own a device capable of displaying 3D stereoscopic content.

The invention can be implemented in software and can be provided as a standalone software component to customers.

The depth map modification carried out by the different possible implementations of the invention can be used to take advantage of various depth cues, including:

(i) a haze 3D depth cue where high contrast elements (i.e. very bright or very dark) are present near the viewer and low contrast elements (i.e. mid tone Y values) are present far from the viewer (ii) when a viewer is in "against the light" conditions, dark elements of the observed scene are nearer than bright elements These two depth cues are related and are combined in the function F in the example above.

(iii) if an image does not have a large mid tone (luminance) content, there is a probability that there is high contrast text and that the strength of the luminance based depth map should be reduced.

(iv) when a viewer is in front of blue sky then blue sky is on the top and if blue is at the bottom then there is a probability that this is the reflection of blue sky on nearer water.

Various concepts have been implemented by the system shown. However, these can be applied individually rather than in combination. The components of the system which can be combined in different ways include depth map modification or generation taking into account:

a relationship between pixel height and depth which is dependent on luminance (42 in FIG. 4)

a relationship between luminance and depth (40 in FIG. 4)

These first two measures are used to create a combined relationship between pixel height, luminance and depth by the function F in FIG. 4.

a relationship between pixel height and depth which is dependent on colour (82 in FIG. 9)

a measure of colour range, with the depth map reduced in its effect or images with large colour contrast (36 in FIG. 3, FIG. 7 and FIG. 11)

a measure of luminance range, with the depth map reduced in its effect for images with large luminance contrast (34 in FIG. 3, FIG. 6 and FIG. 11).

These five measures can be applied individually or in any combination. They share in common that they can be implemented based on the luminance and/or chrominance and/or pixel position information in connection with the pixelated display.

The invention is of particular interest for processing an original depth map which has been generated with a process based on the color of pixels. Even though this approach of depth map generation is far from accurate, it is not computationally intensive. The invention is of less interest for a more accurate the original depth map. However, the invention can be applied to an existing depth map generated by any technique, where there is room for improvement of the depth function implemented.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of processing image data comprising:
   receiving 2D image data representing a pixelated image with a width and a height;
   receiving a depth map in respect of the 2D image data;
   processing the depth map to derive a modified depth map; and
   generating left and right image data together forming a 3D image based on the modified depth map and the 2D image data, wherein processing the depth map comprises at least one of:
   analyzing luminance information in respect of a set of pixels, and modifying the depth map using a midtone analysis of the luminance information of the image and a function which correlates depth with pixel height in the pixelated image and which has a different correlation between depth and pixel height for different luminance values, wherein the midtone analysis includes obtaining a ratio of a number of pixels with luminance within a central luminance band compared to a total number of pixels; and
   analyzing chrominance information in respect of the set of pixels, and modifying the depth map using a function which correlates depth with pixel height in the pixelated image and which has a different correlation between depth and pixel height for different chrominance values.

2. The method as claimed in claim 1, wherein the function implements a first relationship between luminance and depth.

3. The method as claimed in claim 2, wherein the function additionally implements a second relationship which is such that for high luminance values the function has an greater correlation between depth and pixel height than for low luminance values.

4. The method as claimed in claim 3, wherein for high luminance values, the correlation is such that a depth for pixels at a top of the image corresponds to a position further behind the display than for pixels at a bottom of the image.

5. The method as claimed in claim 1, wherein modifying the depth map comprises:
   generating a first compensation depth map using the function; and
   combining the first compensation depth map with the received depth map.

6. The method as claimed in claim 5, wherein the first compensation depth map is scaled in dependence on Rail the midtone analysis before being combined with the received depth map.

7. The method as claimed in claim 6, wherein the scaling is greatest for images with a high ratio of central luminance band pixels.

8. The method as claimed in claim 5, further comprising:
   detecting blue pixels in the pixelated image, and, for the blue pixels;
   further modifying the depth map with a second function which correlates depth with pixel height in the pixelated image.

9. The method as claimed in claim 8, wherein the further modifying the depth map comprises:
   generating a second compensation depth map using the second function, and
   combining the depth map as modified by the first function with the second compensation depth map.

10. A method of processing image data comprising:
    receiving 2D image data representing a pixelated image with a width and a height;
    receiving a depth map in respect of the 2D image data;

processing the depth map to derive a modified depth map; and forming a 3D image based on the modified depth map and the 2D image data, wherein processing the depth map comprises analyzing chrominance information in respect of the set of pixels, modifying the depth map uses a function which correlates depth with pixel height in the pixelated image and which has a different correlation between depth and pixel height for different chrominance values, and a weighting factor is based on a saturation analysis of chrominance content of the image data.

11. The method as claimed in claim 10, wherein the saturation analysis comprises:

determining a range of U and V values within the pixelated image; and deriving a chrominance saturation measure.

12. A non-transitory computer-readable storage medium containing a computer program that performs the method of claim 1, when said program is run on a computer.

13. An image data processor, comprising:

a device configured to receive a 2D image data representing a pixelated image with a width and a height;

a device configured to receive a depth map in respect of the 2D image data;

a processor configured to process the depth map to derive a modified depth map;

a device configured to generate left and right image data together forming a 3D image based on the modified depth map and the 2D image data, wherein the processor is configured to perform at least one of:

analyzing luminance information in respect of the set of pixels, and modifying the depth map using a midtone analysis of the luminance information of the image and a function which correlates depth with pixel height in the pixelated image and which has a different correlation between depth and pixel height for different luminance values; and analyzing chrominance information in respect of the set of pixels, and modifying the depth map using a function which correlates depth with pixel height in the pixelated image and which has a different correlation between depth and pixel height for different chrominance values, wherein the midtone analysis includes obtaining a ratio of a number of pixels with luminance within a central luminance band compared to a total number of pixels.

14. An image data processor, comprising:

a device configured to receive a 2D image data representing a pixelated image with a width and a height;

a device configured to receive a depth map in respect of the 2D image data;

a processor configured to process the depth map to derive a modified depth map;

a device configured to generate left and right image data together forming a 3D image based on the modified depth map and the 2D image data, wherein the processor is configured to perform at least one of: analyzing luminance information in respect of the set of pixels, and modifying the depth map using a function which correlates depth with pixel height in the pixelated image and which has a different correlation between depth and pixel height for different luminance values; and analyzing chrominance information in respect of the set of pixels, and modifying the depth map using a midtone analysis of the luminance information of the image and a function which correlates depth with pixel height in the pixelated image and which has a different correlation between depth and pixel height for different chrominance values, wherein the midtone analysis includes obtaining a ratio of a number of pixels with luminance within a central luminance band compared to a total number of pixels.

* * * * *